US012398584B2

(12) United States Patent
Inan et al.

(10) Patent No.: US 12,398,584 B2
(45) Date of Patent: Aug. 26, 2025

(54) MOTOR VEHICLE LOCK

(71) Applicant: KIEKERT AKTIENGESELLSCHAFT, Heiligenhaus (DE)

(72) Inventors: Ömer Inan, Dorsten (DE); Peter Szegeny, Engelskirchen (DE); Thorsten Bendel, Oberhausen (DE); Michael Scholz, Essen (DE); Holger Schiffer, Meerbusch (DE)

(73) Assignee: Kiekert AG, Heiligenhaus (DE)

( * ) Notice: Subject to any disclaimer, the term of this patent is extended or adjusted under 35 U.S.C. 154(b) by 213 days.

(21) Appl. No.: 18/262,026

(22) PCT Filed: Jan. 13, 2022

(86) PCT No.: PCT/DE2022/100024
§ 371 (c)(1),
(2) Date: Jul. 19, 2023

(87) PCT Pub. No.: WO2022/167030
PCT Pub. Date: Aug. 11, 2022

(65) Prior Publication Data

US 2024/0084624 A1 Mar. 14, 2024

(30) Foreign Application Priority Data

Feb. 4, 2021 (DE) ..................... 10 2021 102 595.8

(51) Int. Cl.
*E05B 81/14* (2014.01)
*E05B 77/12* (2014.01)

(52) U.S. Cl.
CPC .............. *E05B 81/14* (2013.01); *E05B 77/12* (2013.01)

(58) Field of Classification Search
CPC .......... E05B 81/14; E05B 77/12; E05B 77/06; E05B 77/04
See application file for complete search history.

(56) References Cited

U.S. PATENT DOCUMENTS

2020/0263455 A1* 8/2020 Nam ........................ E05B 77/04

FOREIGN PATENT DOCUMENTS

DE 1816942 A1 7/1970
DE 102011100090 A1 10/2012
(Continued)

OTHER PUBLICATIONS

International Search Report mailed Mar. 25, 2022, for priority International Application No. PCT/DE2022/100024.

*Primary Examiner* — Christine M Mills
*Assistant Examiner* — Christopher F Callahan
(74) *Attorney, Agent, or Firm* — Renner, Otto, Boisselle & Sklar, LLP

(57) ABSTRACT

A motor vehicle lock, in particular a motor vehicle door lock, which is equipped with a locking mechanism essentially consisting of a rotary latch and a pawl. Furthermore, an actuating lever chain for the locking mechanism is provided. The actuating lever chain has at least one actuating lever, a coupling element, and a trigger lever on the locking mechanism side. Furthermore, an inertia element is also provided for acting on the coupling element at least in the event of a crash. According to the invention, the coupling element is disengaged during normal operation and is only engaged in the event of a crash by means of the inertia element.

17 Claims, 2 Drawing Sheets

(56) References Cited

FOREIGN PATENT DOCUMENTS

| | | | | | |
|---|---|---|---|---|---|
| DE | 102012106393 | A1 | * | 6/2013 | ............. E05B 77/06 |
| DE | 102017102549 | A1 | | 8/2018 | |
| JP | S5844360 | U | | 3/1983 | |
| JP | H04137184 | U | | 12/1992 | |
| JP | H08303082 | A | | 11/1996 | |
| KR | 20170021996 | A | * | 3/2017 | |

* cited by examiner

MOTOR VEHICLE LOCK

This application is a national phase of International Patent Application No. PCT/DE2022/100024 filed Jan. 13, 2022, which claims priority to German Patent Application No. 10 2021 102 595.8 filed Feb. 4, 2021, each of which is hereby incorporated herein by reference in its entirety.

FIELD OF DISCLOSURE

The invention relates to a motor vehicle lock, in particular a motor vehicle door lock, having a locking mechanism consisting essentially of a rotary latch and pawl, and having an actuating lever chain for the locking mechanism, wherein the actuating lever chain has at least one actuating lever, a coupling element and a trigger lever, and wherein an inertia element is additionally provided for acting on the coupling element at least in the event of a crash.

BACKGROUND OF DISCLOSURE

The actuating lever chain generally serves to enable locking mechanisms to be opened mechanically. For this purpose, the actuating lever is acted upon manually. If the coupling element is coupled in or engaged and consequently the actuating lever chain is mechanically closed, the actuating lever, by means of the engaged coupling element, finally ensures that, with the aid of the trigger lever, the pawl can be lifted from its engagement with the rotary latch. This opens the locking mechanism. The same applies to an associated motor vehicle door. In fact, said motor vehicle lock or motor vehicle door lock is usually arranged in the interior of such a motor vehicle door and interacts with a locking bolt at the body side. In the open state of the locking mechanism, the rotary latch releases the locking bolt so that the motor vehicle door can be opened.

The above-mentioned actuating lever chain can in principle be used solely for opening the locking mechanism. In order to avoid an unintentional opening of the locking mechanism in the event of a crash and in conjunction with the high accelerations occurring there, the inertia element typically ensures that the coupling element is transferred from its coupled in or engaged state into the decouple or disengaged state. As a result, the actuating lever chain is interrupted so that the locking mechanism is not opened unintentionally. This also applies to the associated motor vehicle door so that the safety devices generally provided at this point, such as for example side airbag, belt tensioners, etc., can deploy their full effect in the event of a crash to protect the occupants of the motor vehicle in question.

In the generic prior art according to DE 10 2017 102 549 A1, a motor vehicle lock is realized in which the trigger lever can be coupled with the actuating lever with the aid of the coupling element. In addition, a means for controlling the coupling lever is realized. In fact, a control lever interacts with an inertia lever and is guided for this purpose in a control contour of the inertia lever. In this way, a defined control of the coupling behavior can be provided.

Here the overall design is such that when the actuating lever is actuated with a normal speed, the control lever follows the movement of the actuating lever. This has the consequence that the coupling element remains engaged and can operate on the trigger lever to open the locking mechanism. However, if the actuating lever is acted upon with an excessive speed, for example in the event of a crash, this has the result that the inertia element cannot follow the movement of the actuating lever with the known teaching. As a result, the coupling element disengages from the trigger lever or is uncoupled. The actuating lever chain is interrupted as desired.

Nowadays, motor vehicles are increasingly equipped with an electric motor drive for motorized opening of the locking mechanism. The actuating lever chain is then either used for transmitting the opening movements of the electric motor drive or is primarily realized in the case that the electric motor drive fails but the associated motor vehicle door is to be mechanically opened nevertheless. The problem arises here that motor vehicles are often locked during travel.

In the locked state of the associated motor vehicle lock, however, mechanical opening is not possible, nor is opening by means of the electric motor drive. This is because the locked state usually corresponds to the coupling element assuming its disengaged or removed position. This applies at least to an outer actuating lever chain, i.e., an actuating lever chain which is acted upon from the outside, for example with an external door handle.

If a crash occurs in such a motor vehicle with an electric motor drive for opening the locking mechanism and additionally an actuating lever chain in the locked state, situations are conceivable in which the motor vehicle door cannot (any longer) be opened. This applies in particular when the motor vehicle is locked and additionally the power supply fails. Up to now, no convincing solutions for this have been available. This is where the invention comes in.

SUMMARY OF DISCLOSURE

The invention is based on the technical problem of further developing such a motor vehicle lock and in particular a motor vehicle door lock in such a way that even when the motor vehicle is locked and the power supply has failed, the motor vehicle door can still be unlocked or opened, in particular in the event of a crash.

To solve this technical problem, the invention proposes that, in a generic motor vehicle lock, the coupling element is disengaged in normal operation, and only in the event of a crash is engaged indirectly or directly with the aid of the inertia element.

The invention therefore operates in a manner contrary to the prior art. This is because in the prior art the coupling element is in its engaged or coupled-in state in normal operation, as is taught inter alga in DE 10 2017 102 549 A1, already referenced above. In contrast, according to the invention the coupling element is disengaged in normal operation.

The invention is based on the recognition that the actuating lever chain is not required during normal operation because normal operation corresponds to the locking mechanism being opened with the aid of an additional electric motor drive. In this respect, the actuating lever chain is used primarily in the event of a crash. Therefore, the actuating lever chain can be interrupted in normal operation and such a design is also recommended in order to avoid undesired interactions between, on the one hand, the electric motor drive for opening the locking mechanism and, on the other hand, the trigger lever as part of the actuating lever chain.

The coupling element is engaged only in the event of a crash and the associated and correspondingly occurring accelerations, and this is done with the aid of the inertia element. Here the inertia element can immediately and directly act on the coupling element. According to the invention, however, the coupling element is regularly engaged indirectly with the aid of the inertia element. I.e., the inertia element allows a movement of the coupling element into the engaged state.

Here the invention is based on the further finding that in the event of such a crash the power supply is generally interrupted, so that the electric motor drive cannot (any longer) be used for opening the locking mechanism. In such a case, the actuating lever chain is mechanically closed. As a result, it is possible in particular for the relevant motor vehicle door to be opened from the outside by, for example, arriving rescue personnel. I.e., in such a case, the actuating lever chain represents a kind of "backup solution" for the event of a crash, and according to the invention is effective at all only in such a crash situation.

In detail, for this purpose the coupling element is formed at least in two parts with a coupling lever and a transmission lever. The coupling lever can be transferred from a disengaged to an engaged position with the aid of the transmission lever. As already explained, the coupling lever is in its uncoupled position during normal operation. Consequently, only in the event of a crash does the transmission lever ensures that the coupling lever is transferred from its disengaged position in normal operation into the engaged position. In the engaged position of the coupling lever, the actuating lever chain is mechanically closed so that the pawl can be lifted from its engagement with the rotary latch via the actuating lever, the coupling element or the engaged coupling lever and, finally, the trigger lever. A locking bolt previously held captive with the aid of the rotary latch is released. The same applies to the associated motor vehicle door.

For this purpose, the coupling lever is advantageously mounted on the trigger lever, and is usually rotatable. In addition, it has proven successful in this context for the trigger lever to be mounted coaxially with the actuating lever. In this way, an overall structurally simple and space-saving design can be realized.

In addition, the usual procedure is for the coupling lever to mechanically connect the actuating lever and the trigger lever in the coupled position. In the disengaged position, the coupling lever mechanically separates the actuating lever and the trigger lever, Normal operation corresponds to this. The change of the clutch lever from the predominantly assumed disengaged position into the engaged position can now be brought about in that the coupling lever rotatably mounted on the trigger lever is pivoted. The pivoting movement of the coupling lever from its disengaged into the engaged position now corresponds to the fact that the coupling lever generally moves against a stop on the actuating lever. As a result, the actuating lever is mechanically connected to the coupling lever, which in turn, due to its rotatable mounting on the trigger lever, finally produces the desired mechanical connection to the pawl via the trigger lever.

In addition, usually the procedure is such that the transmission lever is pretensioned by means of a spring in contact with the inertia element. That is, the spring ensures that the transmission lever is pre-tensioned in the direction of the inertia element. Here, two contact surfaces, on the one hand on the transmission lever and on the other hand on the inertia element, contact one another during normal operation. As a result of the mutual contact of the two contact surfaces, the inertia element is held in the therewith associated non-deflected position by friction of the contact surfaces during normal operation. The friction of the contact surfaces on one another can or be varied by working with roughened or smoothed contact surfaces.

However, if a crash occurs, the inertia element ensures, in the case of such a crash and in the deflected position associated therewith, that the transmission lever is released. This is because the contact surface on the inertia element moves away, due to its deflection, from the corresponding contact surface on the transmission lever. Since the transmission lever is spring-loaded, it is usually pivoted. The pivoting of the transmission lever in the event of a crash ensures that the transmission lever engages the coupling lever.

The inertia element is advantageously designed as a pendulum element. The pendulum element can usually be pivoted about a pivot point or a pivot axis. For this purpose, the pendulum element is regularly mounted rotatably in a housing of the motor vehicle lock. The pendulum plane swept by the pendulum element during its deflection can typically coincide with a transverse plane of the motor vehicle, i.e., the X-Y plane. Here, the X direction corresponds regularly to the longitudinal direction of the motor vehicle, whereas the transverse direction of the motor vehicle is identified with the Y direction. As a result, the pendulum element or inertia element is not influenced by any accelerations that may occur in the vertical direction or Z-direction. Of course, this applies only by way of example and other spatial arrangements are equally conceivable and are encompassed by the invention.

As already described, the specially designed coupling element can represent a component of the actuating lever chain, with the aid of which the locking mechanism can in turn be opened in the event of a crash. In general, the actuating lever chain can also be combined with an additional locking lever chain. In general, however, the actuating lever chain is typically added, as a redundancy solution, to an electric motor drive for opening the locking mechanism.

In any case, the present invention is structurally particularly simple and compact, and the actuating lever chain or external activation lever chain can be implemented in a practical manner in addition to and supplementing the electric motor drive. The essential advantages can be seen here in conjunction with the simple triggering, in accordance with the intended function, in the event of a crash.

BRIEF DESCRIPTION OF DRAWINGS

The invention is explained in greater detail below with reference to drawings which show only one embodiment.

FIG. 1 normal operation

DETAILED DESCRIPTION

Figure 1:
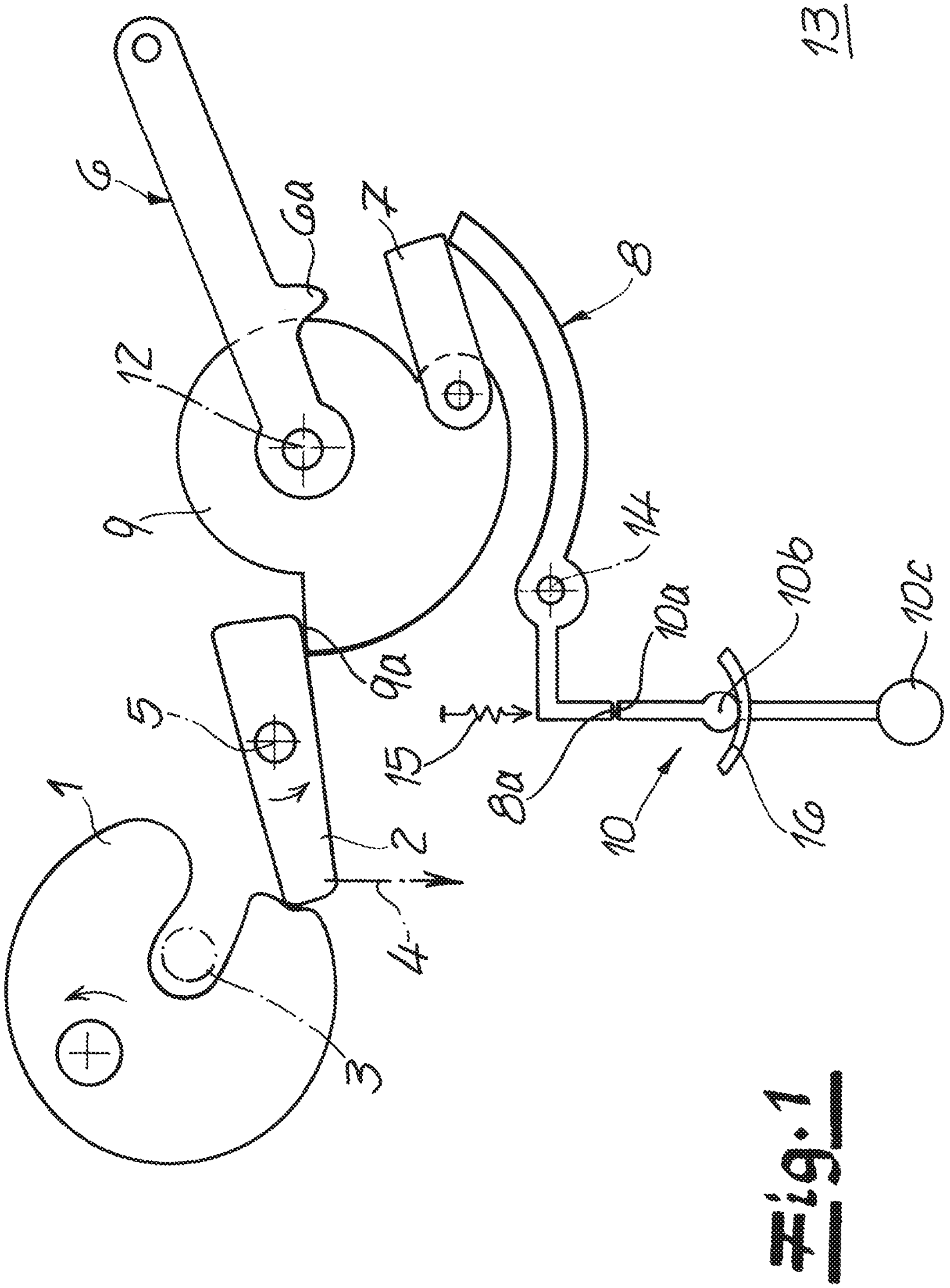
FIG. 1 shows the motor vehicle lock according to the invention in the form of a motor vehicle door lock, in a schematic overview.

FIG. 1 shows a motor vehicle lock which is designed as a motor vehicle door lock and has been reduced to its essential elements. A locking mechanism 1, 2 with a rotary latch 1 and a pawl 2 is provided here. In the closed state of the locking mechanism 1, 2 shown in FIG. 1, the rotary latch 1 ensures that a locking bolt 3 is held captive with its aid. As a result, a motor vehicle door (not shown) which accommodates the motor vehicle lock in its interior is closed relative to a motor vehicle body with the locking bolt 3 attached thereto.

A motorized drive 4 is generally provided for opening the locking mechanism 1, 2. The motorized drive 4 is indicated only by an arrow in FIG. 1. During an opening movement, the motorized drive 4 works on the pawl 2 such that the pawl 2 is pivoted about its axis 5 in the counterclockwise direction. As a result, the pawl 2, in the closed state shown in FIG. 1, releases the rotary latch 1 that was previously in latching engagement with the pawl 2. The rotary latch 1 can then open in a spring-assisted manner in the counterclockwise direction indicated in FIG. 1, and the locking bolt 3 can leave an inlet mouth of the rotary latch 1. The motor vehicle door can in this way be opened.

In addition to this motorized drive 4 for opening the locking mechanism 1, 2, an actuating lever chain 6, 7, 8, 9 is then also realized. With the aid of the actuating lever chain 6, 7, 8, 9, a mechanically redundant opening of the locking mechanism 1, 2 is possible, in particular in the event of a crash, according to the exemplary embodiment.

For this purpose, the actuating lever chain 6, 7, 8, 9 is made up of an actuating lever 6, a coupling element 7, 8 and a trigger lever 9 at the locking mechanism. In addition, an inertia element 10 is provided for acting on the coupling element 7, 8 at least in the event of a crash.

The actuating lever 6 is an external actuating lever 6; this is not limiting. Accordingly, the actuating lever chain 6, 7, 8, 9 is designed to be, also in non-limiting fashion, an external actuating lever chain. In the engaged or coupled state shown in FIG.

2 of the coupling element 7, 8, acting on the actuating lever or external actuating lever 6 with the aid of an outer door handle 11, indicated as an arrow, causes the actuating lever 6 to execute a clockwise movement. This clockwise movement of the actuating lever or external actuating lever 6 is transmitted via the engaged or coupled-in coupling element 7, 8 to the trigger lever 9, which is likewise pivoted clockwise and thereby rotates the pawl 2 counterclockwise about its axis 5, as is indicated by corresponding arrows in FIGS.

1 and 2. In this way, the actuating lever chain 6, 7, 8, 9 is able to mechanically redundantly open the locking mechanism 1, 2 via the outer door handle 11.

Figure 2:
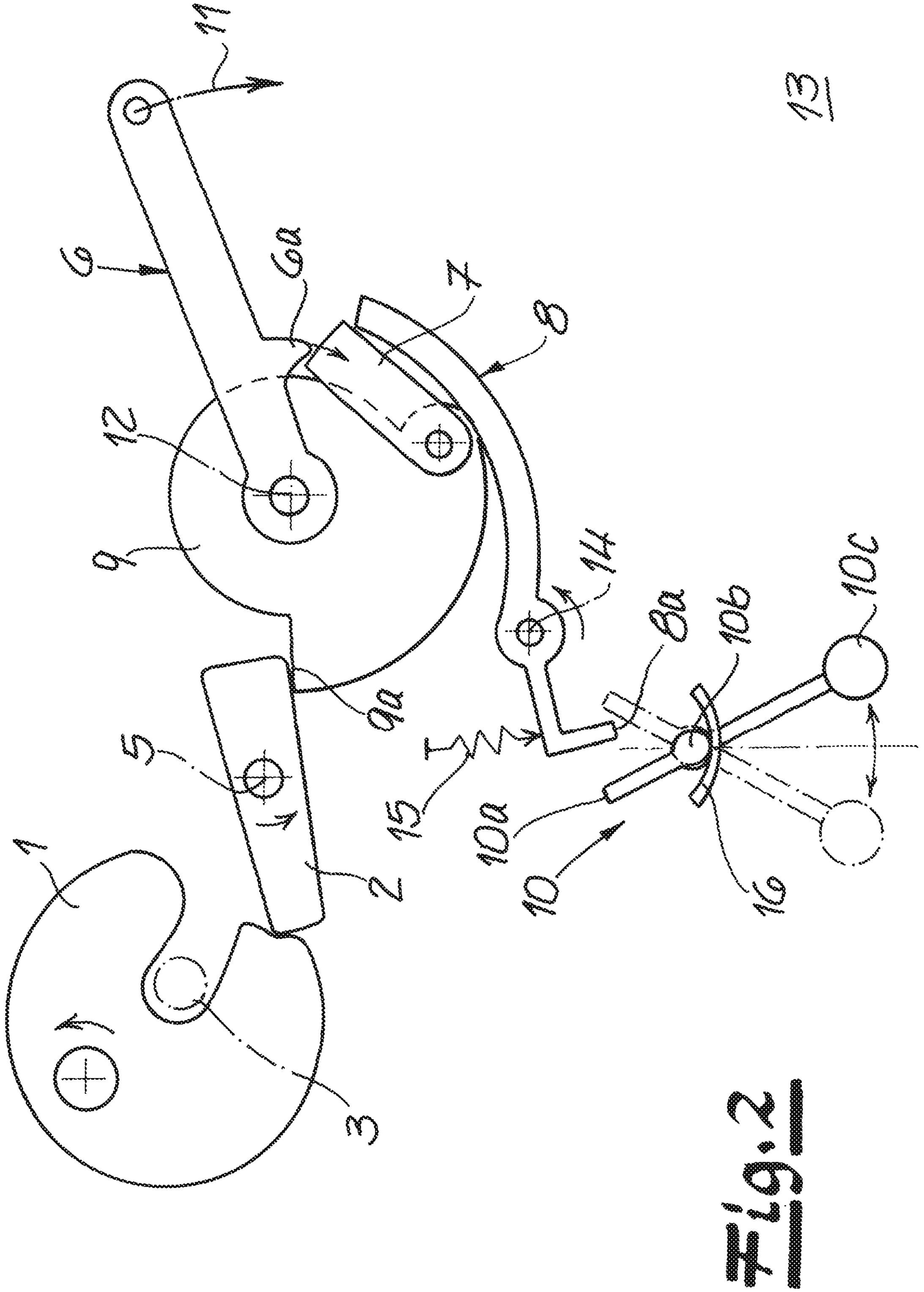
FIG. 2 after crash

According to the invention, the design is now such that the coupling element 7, 8 is removed or disengaged during normal operation. The position of the coupling lever 7, 8 in FIG. 1 corresponds to this. Only in the event of a crash is the coupling element 7, 8 engaged with the aid of the inertia element 10, and this is done indirectly. This includes the position of the coupling element 7, 8 and of the inertia element 10 as shown in FIG. 2.

According to the exemplary embodiment, the coupling element 7, 8 is formed at least in two parts with a coupling lever 7 and a transmission lever 8. As already explained above, the coupling lever 7 is rotatably mounted on the trigger lever 9. The trigger lever 9 itself is disk-shaped, wherein the coupling lever 7 is rotatably mounted on the outer periphery of the disk-shaped actuating lever 9. The transmission lever 8 is also rotatably mounted within a housing 13, which is merely indicated, for receiving the motor vehicle lock. A pivot axis 14 is provided for this purpose.

The coupling lever 7 can now be transferred, using the transmission lever 8, from a disengaged into an engaged position (and possibly back). FIG. 1 shows the disengaged position of the coupling lever 7, which is assumed throughout and during normal operation. If the locking mechanism 1, 2 is to be opened in such a case, the electric motor drive 4 is acted upon for this purpose and ensures that the pawl 2 is rotated about its axis 5 in the counterclockwise direction as described.

The trigger lever 9 and the actuating lever or external actuating lever 6 are mounted on the same axis with respect to the common axis or axis of rotation 12. As a result, the coupling lever 7, in its engaged position according to FIG. 2, ensures that the actuating lever 6 and the trigger lever 9 are mechanically connected to one another. This is because in its engaged position the coupling lever 7 moves against a stop edge 6*a* of the actuating lever 6. If, on the other hand, the coupling lever 7 assumes its disengaged position according to FIG. 1, the actuating lever 6 and the trigger lever 9 are mechanically separated from one another.

The transmission lever 8 is in turn pre-tensioned by a spring 15 in contact with the inertia element 10. The spring 15 ensures that the transmission lever 8 is pivoted counterclockwise with respect to its axis or axis of rotation 14 without the contact with the inertia element 10. This is prevented in normal operation by the transmission lever 8 resting with a contact surface 8*a* against a corresponding contact surface 10*a* of the inertia element 10. The friction between the two contact surfaces 8*a* and 10*a* observed at this point ensures that the inertia element 10 is held in its undeflected position shown in FIG. 1.

If there is now a crash, the inertia element 10 is deflected. The inertia element is a pendulum element 10 according to the exemplary embodiment. For this purpose, the inertia element or pendulum element 10 is rotatably mounted about an axis in the housing 13. For this purpose, the pendulum element 10 may be equipped with an approximately central bearing ball 10*b*, which engages in a cup-shaped bearing shell 16 and thereby provides for the central bearing and the forming of the axis. An inertial mass 10*c* is provided on the end side of the inertia element or pendulum element 10.

If there is now a crash, the pendulum element 10 pivots about its axis, as is indicated by corresponding arrows in FIG. 1. As a result, the head-side contact surface 10*a* on the pendulum element 10 leaves the opposite contact surface 8*a* of the transmission lever 8. As a result, the transmission lever 8 is released from the contact surface 10*a* on the pendulum element 10.

Since the transmission lever 8 is pre-tensioned in the direction of a counterclockwise movement about its axis 14 by the spring 15, the crash as a whole causes the transmission lever 8 to pivot about its axis 14 in a counterclockwise direction, into the position in FIG. 2.

Since the transmission lever 8 is formed with a curved shape at its end at the coupling lever, during the described pivoting movement in the counterclockwise direction this curved shape of the transmission lever 8 ensures that the coupling lever 7 is transferred from its disengaged position in FIG. 1 into the engaged position in FIG. 2. As a result, the coupling lever 7 comes to rest against the stop 6*a* of the actuating lever 6.

While previously any action of the actuating lever or external actuating lever 6 with the aid of the outer door handle 11 about its axis 12 in the clockwise direction with respect to the trigger lever 9 was without effect, the seating of the coupling lever 7 in its coupled state on the stop 6*a* of the actuating lever 6 now ensures that the actuating lever 6 is mechanically connected to the trigger lever 9 via the coupling lever 7, As a result, action on the actuating lever 6 by the external door handle 11 causes a rotational movement of the actuating lever 6 about its axis 12 in a counterclockwise direction, which is transmitted with the same phase to the trigger lever 9. As a result, the trigger lever 9 moves with a trigger edge 9*a* against the pawl 2 and ensures that the pawl 2 is pivoted about its axis 5 in the counterclockwise direction. This has the result that the pawl 2 is lifted from its latching engagement with the rotary latch 1. The rotary latch 1 opens in spring-assisted fashion, so that the previously captive locking bolt 3 is released. This also applies to the motor vehicle door, which is not expressly shown and receives the motor vehicle lock in its interior, even when the motor vehicle door lock is locked as a whole.

LIST OF REFERENCE SIGNS

1 rotary latch
2 pawl
3 locking bolt
4 drive
5 axis
6, 7, 8, 9 actuating lever chain
6 actuating lever
6*a* stop edge
7, 8 coupling element
7 coupling lever
8 transmission lever
8*a* contact surface
9 locking mechanism-side trigger lever
9*a* trigger edge
10 inertia element or pendulum element
10*a* corresponding contact surface
10*b* bearing ball
10*c* mass
11 outer door handle
12 axis or axis of rotation
13 housing
14 axis of rotation
15 spring
16 cup-shaped bearing shell

The invention claimed is:

1. A motor vehicle lock comprising:

a locking mechanism including a rotary latch and a pawl, an actuating lever chain for operating the locking mechanism, wherein the actuating lever chain has at least one actuating lever, a coupling element and a trigger lever that acts at the locking mechanism, and an inertia element for acting on the coupling element in the event of a crash, wherein the coupling element is disengaged in a normal operation and is only engaged in the event of a crash with the aid of the inertia element, wherein the coupling element includes a coupling lever and a transmission lever, wherein the coupling lever is transferred by the transmission lever from an uncoupled position into a coupled position, and wherein the coupling lever further is transferred by the transmission lever back from the coupled position to the uncoupled position.

2. The motor vehicle lock according to claim 1, wherein the coupling lever is mounted on the trigger lever.

3. The motor vehicle lock according to claim 1, wherein the trigger lever is mounted coaxially with the actuating lever.

4. The motor vehicle lock according to claim 1, wherein the coupling lever in the coupled position mechanically connects the actuating lever and the trigger lever to one another, and in the uncoupled position the coupling lever separates the actuating lever and the trigger lever from one another.

5. The motor vehicle lock according to claim 1, wherein the transmission lever is pre-tensioned with a spring in contact with the inertia element.

6. The motor vehicle lock according to claim 1, wherein, in the event of a crash and in a deflected position, the inertia element releases the transmission lever, which in turn couples the coupling lever.

7. The motor vehicle lock according to claim 1, wherein the inertia element is designed as a pendulum element that rotates about a pivot axis.

8. The motor vehicle lock according to claim 7, further comprising a housing, wherein the pendulum element is rotatably mounted in the housing.

9. The motor vehicle lock according to claim 1, wherein the coupling lever is rotatably mounted on the trigger lever, and the coupling lever acts against a stop on the actuating lever when the coupling lever moves from the uncoupled position to the coupled position.

10. The motor vehicle lock according to claim 1, wherein the actuating lever is an external actuating lever that is connected to a door handle.

11. The motor vehicle lock according to claim 1, wherein the trigger lever acts on the pawl to open the locking mechanism.

12. The motor vehicle lock according to claim 1, wherein the trigger lever is disk-shaped, and the coupling lever is rotatably mounted on an outer periphery of the disk-shaped trigger lever.

13. The motor vehicle lock according to claim 8, wherein the pendulum element has a bearing ball that engages with a cup-shaped bearing shell, and an inertial mass provided on an end side of the pendulum element opposite from the bearing ball.

14. The motor vehicle lock according to claim 1, wherein the transmission lever and the inertia element engage at opposing contact surfaces during the normal operation, and in the event of a crash and in a deflected position, the inertia element releases the transmission lever disengaging the opposing contact surfaces, which in turn couples the coupling lever.

15. The motor vehicle lock according to claim 1, wherein the transmission lever has a curved shape.

16. A motor vehicle lock comprising:

a locking mechanism including a rotary latch and a pawl, an actuating lever chain for operating the locking mechanism, wherein the actuating lever chain has at least one actuating lever, a coupling element and a trigger lever that acts at the locking mechanism, and an inertia element for acting on the coupling element in the event of a crash, wherein the coupling element is disengaged in a normal operation and is only engaged in the event of a crash with the aid of the inertia element, wherein the trigger lever is mounted coaxially with the actuating lever.

17. A motor vehicle lock comprising:

a locking mechanism including a rotary latch and a pawl, an actuating lever chain for operating the locking mechanism, wherein the actuating lever chain has at least one actuating lever, a coupling element and a trigger lever that acts at the locking mechanism, and an inertia element for acting on the coupling element in the event of a crash, wherein the coupling element is disengaged in a normal operation and is only engaged in the event of a crash with the aid of the inertia element, wherein the coupling element includes a coupling lever and a transmission lever, and wherein the transmission lever and the inertia element engage at opposing contact surfaces during the normal operation, and in the event of a crash and in a deflected position, the inertia element releases the transmission lever disengaging the opposing contact surfaces, which in turn couples the coupling lever.

* * * * *